(12) United States Patent
Buesing et al.

(10) Patent No.: US 10,967,965 B2
(45) Date of Patent: Apr. 6, 2021

(54) ELASTIC FLAPPING HINGE FOR CONNECTING A ROTOR BLADE TO A ROTOR HUB OF A ROTARY WING AIRCRAFT

(71) Applicant: AIRBUS HELICOPTERS DEUTSCHLAND GMBH, Donauworth (DE)

(72) Inventors: Moritz Buesing, Augsburg (DE); Rupert Pfaller, Riemerling (DE); Martin Ortner, Unterhaching (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 53 days.

(21) Appl. No.: 16/106,288

(22) Filed: Aug. 21, 2018

(65) Prior Publication Data
US 2019/0061928 A1 Feb. 28, 2019

(30) Foreign Application Priority Data
Aug. 28, 2017 (EP) .................................... 17400052

(51) Int. Cl.
*B64C 27/33* (2006.01)
*B64C 27/635* (2006.01)
*B64C 27/48* (2006.01)

(52) U.S. Cl.
CPC ............. *B64C 27/33* (2013.01); *B64C 27/48* (2013.01); *B64C 27/635* (2013.01)

(58) Field of Classification Search
CPC ......... B64C 27/33; B64C 27/35; B64C 27/48; B64C 27/635; B64C 11/16; B64C 11/20
See application file for complete search history.

(56) References Cited

U.S. PATENT DOCUMENTS 2,951,544 A * 9/1960 Kaman .................. B64C 27/37
                                                       416/147
4,344,739 A   8/1982 Derschmidt et al.
(Continued)

FOREIGN PATENT DOCUMENTS

EP       2894093 A1    7/2015

OTHER PUBLICATIONS

European Search Report for European Application No. EP 17400052, Completed by the European Patent Office, dated Oct. 31, 2017, 9 pages.

*Primary Examiner* — Igor Kershteyn
*Assistant Examiner* — Elton K Wong
(74) *Attorney, Agent, or Firm* — Brooks Kushman P.C.

(57) ABSTRACT

An elastic flapping hinge for connecting a rotor blade to a rotor hub of a rotary wing aircraft, comprising an elastic flapping hinge member arrangement that includes a hub attachment area for attachment to the rotor hub, a connection area for attachment to the rotor blade, and an elastic flapping hinge area that is arranged between the hub attachment area and the connection area and adapted to allow flapping movements, the elastic flapping hinge member arrangement comprising at least two elastic flapping hinge members having a first bending stiffness for flapping movements and a second bending stiffness for lead-lag movements, the first bending stiffness being smaller than the second bending stiffness, wherein the at least two elastic flapping hinge members diverge from each other in the elastic flapping hinge area by a predetermined divergence angle.

20 Claims, 8 Drawing Sheets

(56) References Cited

U.S. PATENT DOCUMENTS

| | | | |
|---|---|---|---|
| 4,650,401 A | 3/1987 | Yao et al. | |
| 5,358,381 A * | 10/1994 | Covington | B29C 70/86 |
| | | | 416/134 A |
| 5,820,344 A * | 10/1998 | Hamilton | B64C 27/33 |
| | | | 416/134 A |
| 2006/0165527 A1 | 7/2006 | Stamps et al. | |
| 2006/0186263 A1 * | 8/2006 | Becker | B64C 27/33 |
| | | | 244/17.25 |
| 2006/0198732 A1 | 9/2006 | Becker et al. | |
| 2015/0034772 A1 | 2/2015 | Foskey et al. | |
| 2015/0158582 A1 * | 6/2015 | Buesing | B64C 27/35 |
| | | | 416/134 A |
| 2015/0197334 A1 * | 7/2015 | Pfaller | B64C 27/48 |
| | | | 416/134 A |

* cited by examiner

ELASTIC FLAPPING HINGE FOR CONNECTING A ROTOR BLADE TO A ROTOR HUB OF A ROTARY WING AIRCRAFT

CROSS-REFERENCE TO RELATED APPLICATIONS

This application claims priority to European patent application No. EP 17400052.1 filed on Aug. 28, 2017, the disclosure of which is incorporated in its entirety by reference herein.

BACKGROUND OF THE INVENTION

(1) Field of the Invention

The invention is related to an elastic flapping hinge for connecting a rotor blade to a rotor hub of a rotary wing aircraft.

(2) Description of Related Art

In bearingless or hinge- and bearingless rotor systems, elastic hinge units are used to connect rotor blades of a multi-blade rotor of a rotary wing aircraft to an associated rotor hub or shaft of the aircraft. During operation, i. e. rotation of the multi-blade rotor, a respective elastic hinge unit must withstand tremendous centrifugal forces that the rotor blades apply thereto, while permitting their flapping, pitch and lead-lag motions.

Such an elastic hinge unit is usually implemented by means of a so-called "flexbeam unit". In general, a flexbeam unit comprises special, in particular fiber reinforced composite material flexbeam elements that are flexible enough in bending without discrete hinges, in the case of a hingeless rotor system, or in bending and in torsion to allow twisting for blade movement without bearings, in the case of a bearingless rotor system.

These flexbeam elements usually possess lead-lag-soft regions that permit motions of associated rotor blades in a bearingless or a hinge- and bearingless rotor system in the lead-lag direction. The lead-lag-soft regions thus constitute fictitious vertically oriented axes, so-called virtual lead-lag hinges, about which the rotor blades execute forward and backward lead-lag motions, i. e. rotation of the associated rotor blades within a respective rotation plane defined by a given multi-blade rotor. Furthermore, only in a bearingless rotor system, these flexbeam elements usually comprise torsion weak regions that enable torsion, i. e. rotation of the associated rotor blades around their respective rotor blade axes. Moreover, these flexbeam elements realize flapwise-soft regions that enable flapping of the associated rotor blades in the vertical direction, i. e. rotation of the associated rotor blades out of the respective rotation plane defined by the given multi-blade rotor. Thus, the flapwise-soft regions constitute fictitious horizontally oriented axes, so-called virtual flapping hinges, about which the associated rotor blades flap, i. e. execute upward and downward flapwise motions in a bearingless or a hinge- and bearingless rotor system. An associated position of a virtual flapping hinge in spanwise direction of a given rotor blade corresponds to a location of a discrete hinge with the same kinematics. A respective distance between these virtual flapping hinges and an axis of rotation of a rotor shaft of the bearingless or hinge- and bearingless rotor system is referred to as the flapping hinge distance.

In a bearingless or a hinge- and bearingless rotor system, the flapping hinge distance is relatively large. The flapping hinge distance is usually approximately 7 to 12% of a given rotor-disc radius, measured from the axis of rotation of the rotor shaft radially outward to a tip of a selected rotor blade. A large flapping hinge distance in a bearingless or a hinge- and bearingless rotor system allows, during operation, for a good control response and maneuverability of the rotary wing aircraft, but unfortunately also leads to a high natural flapping frequency. This relatively high natural flapping frequency and the vibrations that result therefrom in the bearingless or the hinge- and bearingless rotor system are disadvantageous in terms of flying characteristics of the rotary wing aircraft and lead to large stresses on blade connectors provided at the flexbeam elements for connection of the associated rotor blades. Therefore, it is beneficial to reduce the flapping hinge distance to a value between 4 and 8% of the given rotor-disc radius.

In order to reduce the flapping hinge distance to such a value, a respective bending stiffness for flapping of a given flexbeam element resp. flapwise-soft region located in an area defined by that value must be comparatively small, and a respective flapping stiffness of adjacent areas must be comparatively large. However, the flexbeam element resp. the flapwise-soft region must in any case be sufficiently strong such that centrifugal forces and flight loads may be transferred securely and reliably from a given rotor blade to an associated rotor hub.

The document US 2006/0165527 A1 describes an assembly that is configured to provide flexure to a rotor blade by means of a flexbeam element that provides for a comparatively high strength and a comparatively low bending stiffness for flapping. More specifically, this flexbeam element consists of two thin and wide plates with low bending stiffness for flapping, which are fixed to an associated rotor hub by means of two associated hub plates. The two thin and wide plates are arranged in parallel to each other and contact each other over their entire lengths.

However, desired flapping characteristics of this assembly are essentially determined by the associated hub plates. These associated hub plates are curved at respective radial outer ends such that flapping essentially occurs at these curved radial outer ends.

The document US 2015/0034772 describes a composite flexure for a tiltrotor rotor system connecting a blade to the yoke of the tiltrotor rotor system. The composite flexure features two twisted composite flexure members, each composite flexure members being configured such that the attachment plane at one end of the composite flexure is at an angle relative to the attachment plane at the other end of the composite flexure.

The document US 2006/0198732 describes a rotor system with a rotor mast, a torque-transmission element nonrotatably joined to the rotor mast and a blade connector loop which encircles rotor mast in unattached fashion. The blade connector loop is nonrotatably joined to the torque-transmission element. So, the blade connector loop is not secured to the rotor mast.

The document U.S. Pat. No. 4,650,401 describes a rotor system with an improved flexure element for connecting the rotor yoke to a blade. This improved flexure element features a cruciform member.

The document U.S. Pat. No. 5,820,344 describes a rotor system with a flexure strap for joining the rotary hub and a blade. The flexure strap features one member divided in two arms to be connected to the rotor hub.

The document U.S. Pat. No. 4,344,739 describes a rotor system for tail rotor in which the blades are connected to the rotor mast of the rotor hub. by two spar sections. A first spar sections of each blade is connected to the rotor mast and overlaps with a free clearance a second spar section of the immediately following blade.

BRIEF SUMMARY OF THE INVENTION

It is, therefore, an object of the present invention to provide a new elastic flapping hinge for connecting a rotor blade to a rotor hub of a multi-blade rotor of a rotary wing aircraft. Preferably, the elastic flapping hinge is suitable to allow realization of a flapping hinge distance with a value that may be equal or smaller than 8%, and preferably amounts to 4 to 8%, of a given rotor-disc radius defined by the multi-blade rotor for small and medium sized rotary wing aircrafts. In this context, it should be noted that the expression "small and medium sized rotary wing aircrafts" refers to aircrafts that have less than 5000 kg maximum takeoff weight. For larger rotary wing aircrafts, preferably flapping hinge distances with values of less than 10% may be realized. Furthermore, realization of hingeless rotor systems for large rotary wing aircrafts with more than 10000 kg maximum takeoff weight may be enabled, where conventional hingeless rotor systems are not suitably applicable.

This object is solved by an elastic flapping hinge for connecting a rotor blade to a rotor hub of a rotary wing aircraft, said elastic flapping hinge comprising the features of claim 1.

More specifically, according to the invention an elastic flapping hinge for connecting a rotor blade to a rotor hub of a rotary wing aircraft comprises an elastic flapping hinge member arrangement that includes a hub attachment area for attachment to the rotor hub, a connection area for attachment to the rotor blade, and an elastic flapping hinge area that is arranged between the hub attachment area and the connection area and adapted to allow flapping movements. The elastic flapping hinge member arrangement comprises at least two elastic flapping hinge members having a first bending stiffness for flapping movements and a second bending stiffness for lead-lag movements. The first bending stiffness is smaller than the second bending stiffness. The at least two elastic flapping hinge members diverge from each other in the elastic flapping hinge area by a predetermined divergence angle.

According to one aspect, the inventive elastic hinge unit enables provision of a smooth transition from a low stiffness area at the respective elastic flapping hinge member arrangement, which is provided to allow for a small flapping hinge distance, to a high stiffness area shortly after the connection area in the direction of a tip of an associated rotor blade, which is provided in order to allow for low downward deflection of the associated rotor blade. Thereby, generation of no or only comparatively low peak stresses can be obtained.

Advantageously, the elastic flapping hinge members of the inventive elastic flapping hinge have a comparatively easy design so that they are easy to manufacture. More specifically, they can preferably be embodied by using simple components, e. g. plate-, strip-, bar- and/or lath-like elastic members with simple rectangular or trapezoidal cross sections that may preferably even allow for connection to associated rotor blades with no need for a cross section change. Such plate-, strip-, bar- and/or lath-like elastic members may have a comparatively short length.

Preferably, the plate-, strip-, bar- and/or lath-like elastic members are manufactured using fiber composite materials. Preferably, fiber reinforced polymers are used, such as carbon fiber reinforced polymers, glass fiber reinforced polymers or Aramid fiber reinforced polymers.

More specifically, the elastic flapping hinge member arrangement of the inventive elastic hinge unit preferably comprises two or more elastically deformable plates that are stacked on top of each other. According to one aspect, the elastically deformable plates are stacked at, and adjacent to, a respective rotor hub and diverge towards a blade tip of an associated rotor blade. The elastically deformable plates preferably define an elastic flapping hinge area, at the end of which the elastically deformable plates may be connected through one or more spacer plates, blocks, webs and/or indentations provided within the elastically deformable plates. By means of such a connection, the elastically deformable plates are pushed apart from each other and, therefore, are suitable to transfer normal loads. Furthermore, shear loads can be transferred between the elastically deformable plates by means of such a connection.

According to one aspect, each elastically deformable plate exhibits a low bending stiffness for flapping and a high bending stiffness for lead-lag motions. As the bending stiffness of each elastically deformable plate correlates with its thickness cubed and is linear to its width, the elastically deformable plates are preferably comparatively thin for obtaining the required low bending stiffness for flapping and the high bending stiffness for lead-lag motions.

Nevertheless, when providing comparatively thin elastically deformable plates for implementing the elastic flapping hinge members of the inventive elastic hinge unit, it must also be considered that, in contrast to the bending stiffness, the strength of each elastically deformable plate against centrifugal force is linear to its thickness and the strength against bending correlates with its thickness squared. Furthermore, it must be considered that the width of each elastically deformable plate is constrained by respectively available space around the respective rotor hub on the one hand, and by a possible transition into adjacent elastic torsion and lead-lag hinges on the other hand. Moreover, it must be considered that an overall bending stiffness of a thick elastically deformable plate cannot be reduced by simply separating the latter into a predetermined number of thin elastically deformable plates that are arranged in parallel, as this would only reduce a corresponding shear stiffness.

More specifically, a combined bending stiffness of multiple elastically deformable plates that are arranged in parallel is the sum of all individual bending stiffnesses of the multiple parallel elastically deformable plates that is added to the sum of respective cross-section areas of each one of the multiple parallel elastically deformable plates multiplied with a respective distance from its bending axis squared (so-called contribution of Steiner resp. "Steineranteil"). In other words, when a thick elastically deformable plate is separated into multiple thin elastically deformable plates defining the same total thickness, then the sum of all individual bending stiffnesses of the multiple parallel elastically deformable plates would be much smaller than a respective bending stiffness of the thick elastically deformable plate. For instance, if a thick elastically deformable plate is separated into two separate plates, the sum of the individual bending stiffnesses of the two separate plates amounts to approximately a quarter of the bending stiffness of the thick elastically deformable plate, and if the thick elastically deformable plate is separated into three plates, the sum of the individual bending stiffnesses of the three separate plates amounts to a ninth of the bending stiffness of the thick elastically deformable plate. However, in any case the sum of respective cross-section areas of each one of the multiple parallel elastically deformable plates multiplied with a respective distance from its bending axis squared is equal to the difference resp. the rest of the respective bending stiffness of the thick elastically deformable plate and leads to a S-shaped deformation of the parallel elastically deformable plates.

Furthermore, a total strength of the multiple parallel elastically deformable plates against centrifugal forces corresponds to a respective strength of the thick elastically deformable plate. More specifically, the total strength against bending separates in a similar way as described above with respect to the bending stiffness, i. e. into a first part consisting of the sum of all individual strengths of the multiple parallel elastically deformable plates in addition to a second part consisting of the sum of the respective cross-section areas of each one of the multiple parallel elastically deformable plates multiplied with a respective distance from its bending axis squared and divided by a given largest distance from the bending axis. Consequently, when a thick elastically deformable plate is separated into multiple thin elastically deformable plates defining the same total thickness, then the sum of all individual strengths of the multiple parallel elastically deformable plates would be much smaller than a respective strength of the thick elastically deformable plate. For instance, if a thick elastically deformable plate is separated into two separate plates, the sum of the individual strengths of the two separate plates amounts to approximately half of the strength of the thick elastically deformable plate, and if the thick elastically deformable plate is separated into three plates, the sum of the individual strengths of the three separate plates amounts to a third of the strengths of the thick elastically deformable plate.

Advantageously, by not only providing the inventive elastic hinge unit with two or more elastically deformable plates, but by arranging these elastically deformable plates such that they diverge from each other in the elastic flapping hinge area by a predetermined divergence angle, the elastically deformable plates can deform in a way that, with respect to conventional configurations, significantly reduces an underlying bending stiffness contribution that emanates from the sum of respective cross-section areas of each one of the elastically deformable plates multiplied with a respective distance from its bending axis squared. Without this underlying bending stiffness contribution, each elastically deformable plate bends in operation like an individual beam element without creating the above-described S-shaped deformation. Furthermore, in this configuration associated spacer plates, blocks, webs and/or indentations advantageously prevent shear deformation and a change in distance between the individual elastically deformable plates. This leads to the full effect obtained by the sum of respective cross-section areas of each one of the elastically deformable plates multiplied with a respective distance from its bending axis squared after the elastic flapping hinge area, where a high flapping stiffness is desirable as described above.

Furthermore, by not only providing the inventive elastic hinge unit with two or more elastically deformable plates, but by arranging these elastically deformable plates such that they diverge from each other in the elastic flapping hinge area by a predetermined divergence angle, an underlying strength contribution that emanates from the sum of the respective cross-section areas of each one of the multiple parallel elastically deformable plates multiplied with a respective distance from its bending axis squared and divided by a given largest distance from the bending axis is, with respect to conventional configurations, significantly reduced. In fact, when a thick plate is split into n thinner plates with the same total thickness, then the sum of all individual strengths of the n thinner plates is only reduced by $1/n$, while the sum of all individual bending stiffnesses of the n thinner plates is reduced by $1/(n^2)$. This means that the ratio between bending strength and bending stiffness is increased by the factor n. However, when sizing each one of the n thinner plates for the same bending strength as the thick plate, then the resulting bending stiffness is approximately $1/n$ of the bending stiffness of the thick plate. In this case, the total thickness resp. the sum of all individual thicknesses of the correspondingly sized plates would be larger than the thickness of the thick plate, so that the strength against centrifugal forces and the strength against lead-lag forces can be increased.

Moreover, by not only providing the inventive elastic hinge unit with two or more elastically deformable plates, but by arranging these elastically deformable plates such that they diverge from each other in the elastic flapping hinge area by a predetermined divergence angle, the diverging elastically deformable plates advantageously exhibit increased stiffness and strength against forces in flapping direction, as the diverging elastically deformable plates and the spacers, blocks, webs, and/or indentations form a framework.

In summary, by providing the inventive elastic hinge unit with two or more elastically deformable plates and, more generally, with at least two elastic flapping hinge members that diverge from each other in a predefined elastic flapping hinge area by a predetermined divergence angle, an increased ratio between bending strength and bending stiffness in the predefined elastic flapping hinge area can be achieved and a comparatively short transition to a comparatively high bending stiffness for flapping movements at the end of this predefined elastic flapping hinge area can be enabled. The increased ratio advantageously leads to better scalability and, therefore, also allows applying the elastic flapping hinge to larger rotary wing aircrafts. Furthermore, the increased ratio allows to reduce the bending stiffness for flapping movements of the predefined elastic flapping hinge area without reducing an associated strength provided in the predefined elastic flapping hinge area. The reduced bending stiffness for flapping movements in the predefined elastic flapping hinge area and the comparatively high bending stiffness for flapping movements at the end and/or outside of this predefined elastic flapping hinge area in turn lead to a beneficial virtual flapping hinge offset. Alternatively, this design leads to a higher strength for the same stiffness. The increased bending stiffness and/or strength against forces in flapping direction are also beneficial for respective rotor controls.

According to a preferred embodiment, the at least two elastic flapping hinge members diverge from each other in the elastic flapping hinge area by the predetermined divergence angle such that an at least approximately V-shaped gap is formed in the elastic flapping hinge area between the at least two elastic flapping hinge members.

According to a further preferred embodiment, the at least two elastic flapping hinge members are elastically deformable plates.

According to a further preferred embodiment, the elastically deformable plates are directly joined to each other in the hub attachment area, and the elastically deformable plates are directly or indirectly joined to each other in the connection area.

According to a further preferred embodiment, each one of the elastically deformable plates comprises an indentation region in the connection area.

According to a further preferred embodiment, the indentation regions of the elastically deformable plates are attached to each other.

According to a further preferred embodiment, a first one of the elastically deformable plates comprises first and second indentation regions in the connection area, wherein a second one of the elastically deformable plates comprises first and second indentation regions in the connection area, the first one and the second one of the elastically deformable plates exhibiting at least approximately a W-shaped cross section.

According to a further preferred embodiment, the first and second indentation regions of the first one of the elastically deformable plates are attached to the first and second indentation regions of the second one of the elastically deformable plates.

According to a further preferred embodiment, a spacer is arranged between the first one and the second one of the elastically deformable plates, at least between the first and second indentation regions of the first one of the elastically deformable plates and the first and second indentation regions of the second one of the elastically deformable plates.

According to a further preferred embodiment, at least one web is arranged in the connection area between the elastically deformable plates, wherein the at least one web spaces the elastically deformable plates from each other, and wherein the at least one web is adapted to transfer shear forces between the elastically deformable plates.

According to a further preferred embodiment, the at least one web is embodied as a beam, in particular in the form of an I-beam.

According to a further preferred embodiment, at least one of the elastically deformable plates comprises at least one cut-out.

According to a further preferred embodiment, the at least one of the elastically deformable plates is provided in the hub attachment area with at least two separate arms for attachment to the rotor hub.

According to a further preferred embodiment, the elastically deformable plates are at least partly integrated into at least one of:
 associated rotor hub plates,
 an associated elastic lead-lag hinge and/or torsion area that defines the connection area, and
 the rotor blade.

The present invention further provides a rotary wing aircraft with at least one rotor that comprises at least two rotor blades, and with a rotor hub, each one of the at least two rotor blades being connected to the rotor hub via an associated elastic hinge unit that comprises at least an elastic flapping hinge that is embodied as described above.

BRIEF DESCRIPTION OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Figure 1:
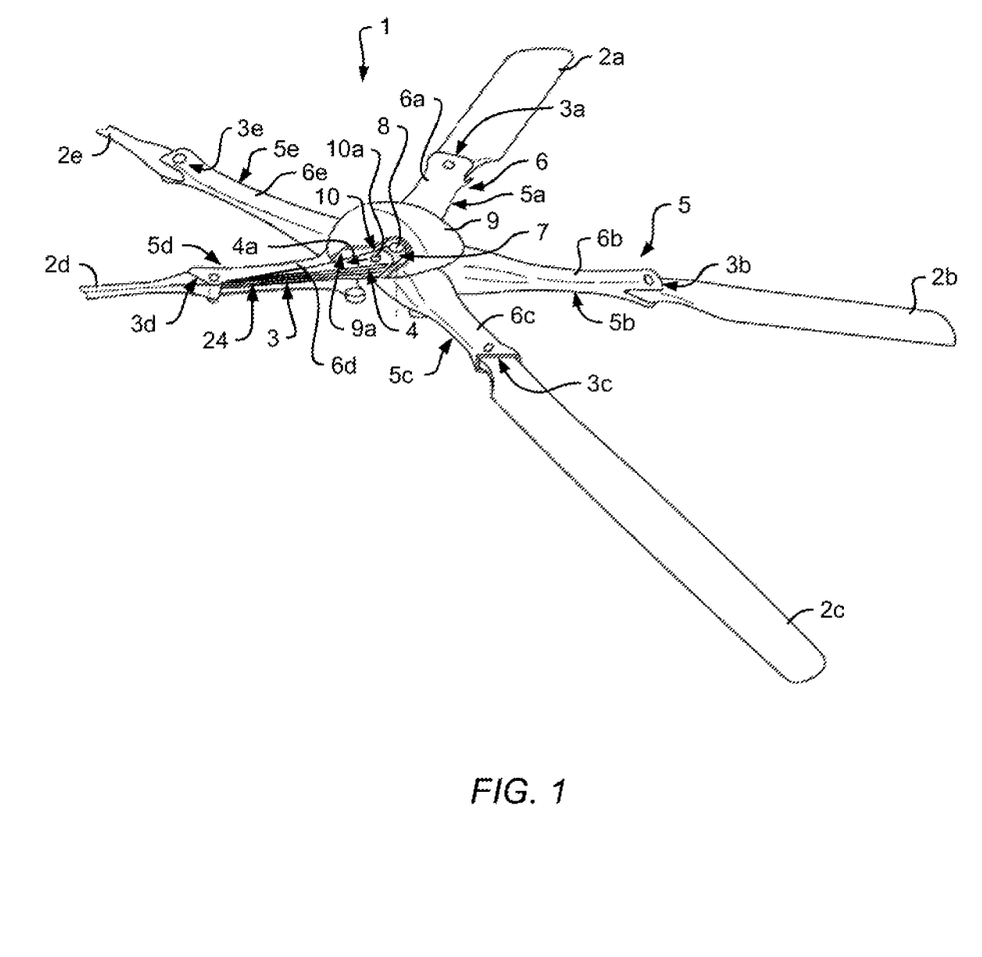
FIG. 1 shows a partially perspective top view of a multi-blade rotor having at least one elastic hinge unit according to the invention.

FIG. 1 shows a multi-blade rotor 1 of a rotary wing aircraft, in particular a multi-blade rotor for a main rotor of a helicopter. The multi-blade rotor 1 illustratively comprises a rotor shaft 8 that is embodied with a rotor hub 7. Furthermore, a rotor head covering cap 9 is provided for covering a central portion of the multi-blade rotor 1, which comprises the rotor hub 7 and which illustratively defines an associated rotor head. The rotor head covering cap 9 is shown with an illustrative cut-out 9a, where the rotor head covering cap 9 is partially cut away in order to permit amongst others the illustration of the rotor hub 7.

The multi-blade rotor 1 is preferably embodied as a bearingless rotor having a multiplicity of elastic hinge units 3 as interfaces between the rotor shaft 8, i. e. the rotor hub 7, and a plurality of rotor blades 2a, 2b, 2c, 2d, 2e. It should, however, be noted that these rotor blades 2a, 2b, 2c, 2d, 2e are not shown in greater detail, neither in FIG. 1 nor in the remaining figures, for simplicity and clarity of the drawings. Furthermore, it should be noted that the expression "multi-blade rotor" should be construed in the context of the present invention such that it encompasses all rotors having at least two rotor blades.

The multiplicity of elastic hinge units 3 preferably implements a multiplicity of torsion elements 5, i. e. torsion elements 5a, 5b, 5c, 5d, 5e. It should, however, be noted that for simplicity and clarity of the drawings only a single elastic hinge unit of the multiplicity of elastic hinge units is designated with the reference number 3 and described representatively hereinafter for all elastic hinge units of the multiplicity of elastic hinge units, which are preferably at least similarly embodied.

More specifically, the multiplicity of elastic hinge units defines a predetermined number of torsion elements 5a, 5b, 5c, 5d, 5e of the multi-blade rotor 1, such that each one of the torsion elements 5a, 5b, 5c, 5d, 5e is associated with a given rotor blade of the plurality of rotor blades 2a, 2b, 2c, 2d, 2e. Furthermore, the torsion elements 5a, 5b, 5c, 5d, 5e preferably comprise a plurality of hub connecting points 10 for connection to the rotor hub 7. For simplicity and clarity of the drawings, however, only a single hub connecting point of the torsion element 5d is designated with the reference sign 10a. Moreover, each one of the torsion elements 5a, 5b, 5c, 5d, 5e preferably comprises one or more blade connecting points 3a, 3b, 3c, 3d, 3e for connection to an associated one of the rotor blades 2a, 2b, 2c, 2d, 2e. Illustratively, the rotor blades 2a, 2b, 2c, 2d, 2e are connected to the torsion elements 5a, 5b, 5c, 5d, 5e at the blade connecting points 3a, 3b, 3c, 3d, 3e and can be disconnected therefrom, if required.

However, according to one aspect the rotor blades 2a, 2b, 2c, 2d, 2e and the torsion elements 5a, 5b, 5c, 5d, 5e, i. e. the multiplicity of elastic hinge units 3, can also be implemented as integral components, so that they could not be disconnected from each other. In this case, the blade connecting points 3a, 3b, 3c, 3d, 3e merely define virtual transition points.

Each one of the torsion elements 5a, 5b, 5c, 5d, 5e is further associated with a control cuff of a multiplicity of control cuffs 6, i. e. control cuffs 6a, 6b, 6c, 6d, 6e. These control cuffs 6a, 6b, 6c, 6d, 6e are preferably adapted for setting in operation of the multi-blade rotor 1 a current pitch or blade angle of the rotor blades 2a, 2b, 2c, 2d, 2e by controlling a current torsion of the torsion elements 5a, 5b, 5c, 5d, 5e, i. e. of the multiplicity of elastic hinge units. For instance, the control cuff 6d is driveable for setting the current pitch or blade angle of the rotor blade 2d by controlling the current torsion of the torsion element 5d, i. e. the current torsion of the elastic hinge unit 3.

According to one aspect, the elastic hinge unit 3 is attached in a suitable manner to the rotor hub 7 and comprises at least an elastic flapping hinge 4, that is illustratively provided for connecting the rotor blade 2d to the rotor hub 7. Optionally, the elastic hinge unit 3 may further comprise an elastic lead-lag hinge and/or torsion area 24. Illustratively, the elastic hinge unit 3 defines a longitudinal direction 4a directed, by way of example, from the rotor shaft 8 to its blade connecting point 3d.

Figure 2:
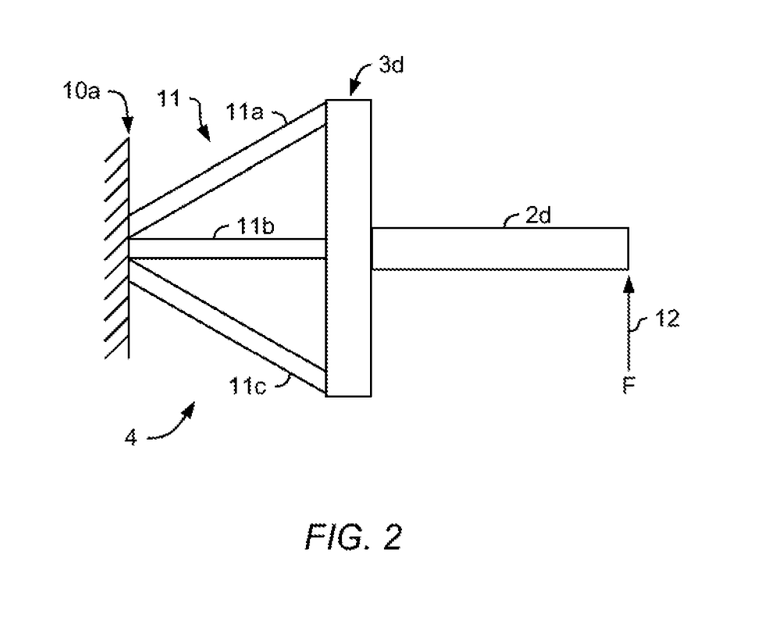
FIG. 2 shows a side view of the elastic flapping hinge of FIG. 1 according to one aspect.

FIG. 2 shows the elastic flapping hinge 4 of FIG. 1, which comprises the hub connecting point 10a for connection to the rotor hub 7 of FIG. 1. According to one aspect, the elastic flapping hinge 4 of FIG. 2 is embodied for use with a comparatively small rotor that implements the multi-blade rotor 1 of FIG. 1 without pitch control. Accordingly, the elastic lead-lag hinge and/or torsion area 24 of FIG. 1 is omitted and the elastic flapping hinge 4 is directly connected to the rotor blade 2d at the associated blade connecting point 3d of FIG. 1.

Preferably, the elastic flapping hinge 4 comprises at least one elastic flapping hinge member arrangement 11. By way of example, only a single elastic flapping hinge member arrangement 11 is provided.

According to one aspect, the elastic flapping hinge member arrangement 11 comprises at least two elastic flapping hinge members. Illustratively, the elastic flapping hinge member arrangement 11 comprises three elastic flapping hinge members 11a, 11b, 11c. Preferably, each one of the elastic flapping hinge members 11a, 11b, 11c has a first bending stiffness for flapping movements and a second bending stiffness for lead-lag movements, the first bending stiffness being smaller than the second bending stiffness. However, the first bending stiffnesses of the three elastic flapping hinge members 11a, 11b, 11c are not necessarily identical with respect to each other and may have differing values. This likewise applies to the second bending stiffnesses of the three elastic flapping hinge members 11a, 11b, 11c.

Preferably, at least two elastic flapping hinge members diverge from each other. Illustratively, the elastic flapping hinge member 11b is coaxial to a longitudinal direction of the rotor blade 2d and each one of the elastic flapping hinge members 11a, 11c diverges from the elastic flapping hinge member 11b.

Figure 3:
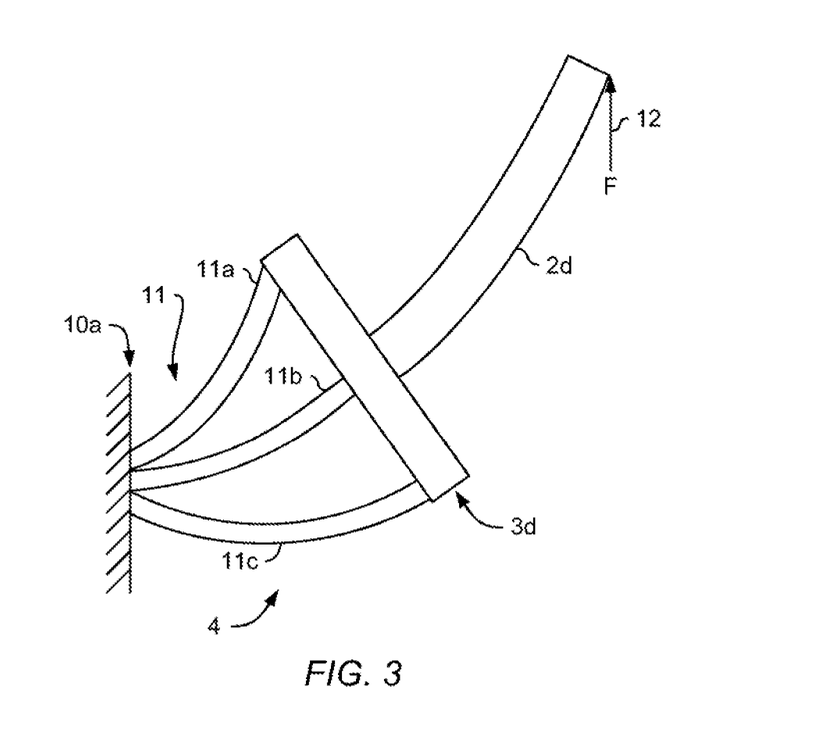
FIG. 3 shows the elastic flapping hinge of FIG. 2 in deflected state.
Figure 4:
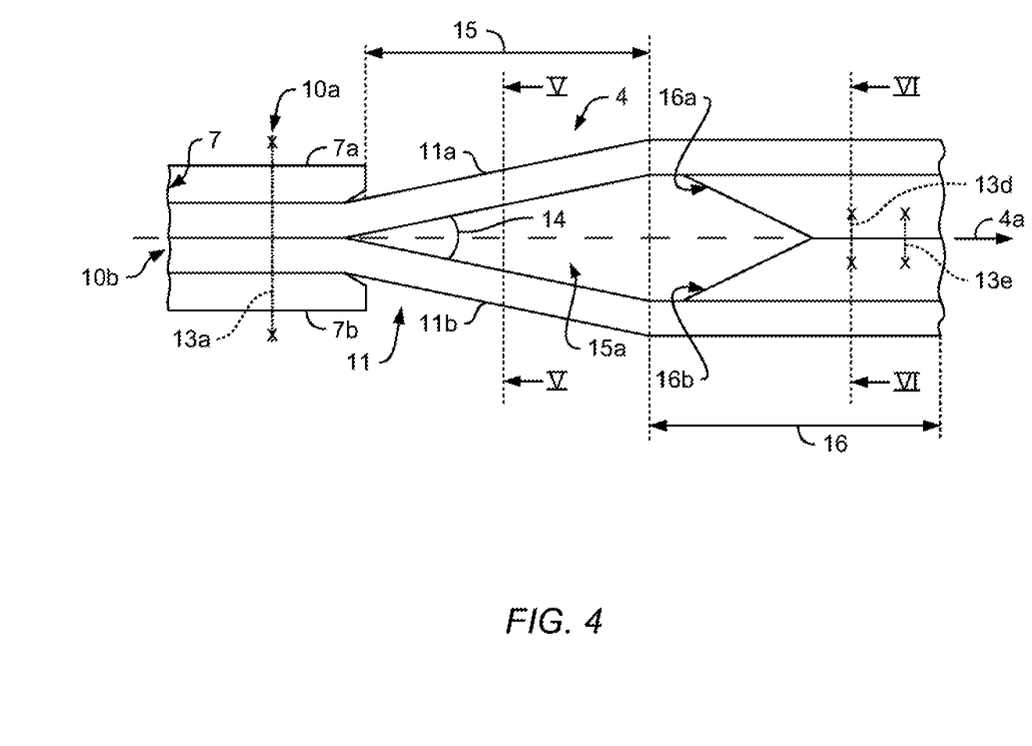
FIG. 4 shows a sectional view of the elastic flapping hinge of FIG. 1 according to another aspect.

The divergence of the elastic flapping hinge members 11a, 11b, 11c is further illustrated and described starting with FIG. 4. Independent therefrom, FIG. 2 and FIG. 3 are provided in combination for illustrating an exemplary flapping movement of the rotor blade 2d and, thus, of the elastic flapping hinge member arrangement 11 upon application of a bending force F to the rotor blade 2d, illustratively in a direction 12.

FIG. 3 shows the elastic flapping hinge 4 of FIG. 2 that comprises the elastic flapping hinge member arrangement 11 with the three elastic flapping hinge members 11a, 11b, 11c. The elastic flapping hinge 4 is shown in deflected state, i. e. after application of the bending force F in the direction 12, as described above at FIG. 2.

As shown in FIG. 3, the application of the bending force F in the direction 12 results in a deflection of each one of the three elastic flapping hinge members 11a, 11b, 11c, and of the rotor blade 2d in the direction 12. This deflection corresponds to a rotation of each one of the three elastic flapping hinge members 11a, 11b, 11c, and of the rotor blade 2d around the elastic flapping hinge 4. It should be noted that this deflection is contrary to the above-described S-shaped deformation.

FIG. 4 shows the elastic flapping hinge 4 of FIG. 1 with the hub connecting point 10a for connection to the rotor hub 7 of FIG. 1. According to one aspect, the elastic flapping hinge 4 of FIG. 4 is embodied for use with any type of rotor that implements the multi-blade rotor 1 of FIG. 1, with or without pitch control.

Preferably, the elastic flapping hinge 4 comprises at least one and, exemplarily, only the single elastic flapping hinge member arrangement 11 of FIG. 2 and FIG. 3. However, in contrast to FIG. 2 and FIG. 3, the elastic flapping hinge member arrangement 11 now only comprises the two elastic flapping hinge members 11a, 11b, which respectively have a first bending stiffness for flapping movements and a second bending stiffness for lead lag movements, the first bending stiffness being smaller than the second bending stiffness.

According to one aspect, the elastic flapping hinge member arrangement 11 includes a hub attachment area 10b for attachment to the rotor hub 7 of FIG. 1, a connection area 16 for attachment to the rotor blade 2d of FIG. 1, and an elastic flapping hinge area 15 that is arranged between the hub attachment area 10b and the connection area 16 and adapted to allow flapping movements. The hub attachment area 10b is preferably arranged between two hub plates 7a, 7b of the rotor hub 7 and attached to the hub plates 7a, 7b at the hub connecting point 10a of FIG. 1, e. g. by means of one or more suitable hub connecting bolts 13a. A respective number of the hub connecting bolts 13a can be determined in an application-specific manner and vary from one application to another.

More specifically, in the hub attachment area 10b the two elastic flapping hinge members 11a, 11b are preferably arranged in parallel to each other and contact resp. directly join each other. Preferentially, the hub attachment area 10b then merges into the elastic flapping hinge area 15 at respective free radial outer ends of the hub plates 7a, 7b, which may at least partly be rounded to support respective flapping movements of the rotor blade 2d of FIG. 1, i. e. of the two elastic flapping hinge members 11a, 11b.

According to one aspect, the two elastic flapping hinge members 11a, 11b diverge from each other in the elastic flapping hinge area 15 by a predetermined divergence angle 14. Preferably, the two elastic flapping hinge members 11a, 11b diverge from each other in the elastic flapping hinge area 15 by the predetermined divergence angle 14 such that an at least approximately V-shaped gap 15a is formed in the elastic flapping hinge area 15 between the two elastic flapping hinge members 11a, 11b. The predetermined divergence angle 14 is preferentially formed in a direction that corresponds to the height direction of the rotor shaft 8 of FIG. 1. Preferably, the predetermined divergence angle 14 is selected from a range of 3° to 40° and, exemplarily, amounts to approximately 30°.

Illustratively, each one of the two elastic flapping hinge members 11a, 11b diverges from a longitudinal axis of the rotor blade 2d of FIG. 1, which is illustratively indicated by the longitudinal direction 4a of FIG. 1, by half of the predetermined divergence angle 14. However, other configurations are likewise contemplated.

According to one aspect, each one of the two elastic flapping hinge members 11a, 11b is embodied as an elastically deformable plate. Therefore, the two elastic flapping hinge members 11a, 11b are also referred to hereinafter as the two elastically deformable plates 11a, 11b, for simplicity and clarity.

As described above, the two elastic flapping hinge members 11a, 11b and, thus, the two elastically deformable plates 11a, 11b are directly joined to each other in the hub attachment area 10b. Furthermore, the two elastically deformable plates 11a, 11b are preferably directly joined to each other in the connection area 16, as described hereinafter by way of example, or they are indirectly joined as described below by way of example with reference to FIG. 7 to FIG. 12.

In contrast thereto, the two elastically deformable plates 11a, 11b are preferably spaced apart from each other and, thus, do not join each other in the elastic flapping hinge area 15, as they diverge from each other in the elastic flapping hinge area 15 by the predetermined divergence angle 14. The elastic flapping hinge area 15 then merges into the connection area 16 at a point, where the two elastically deformable plates 11a, 11b are preferably re-oriented at least approximately in parallel to each other.

It should be noted that the connection area 16 can be implemented as an integral part of the rotor blade 2d of FIG. 1. Alternatively, the connection area 16 may be connected to the rotor blade 2d of FIG. 1 at the blade connecting point 3d of FIG. 1. For instance, the connection area 16 may form the elastic lead-lag hinge and/or torsion area 24 of FIG. 1.

According to one aspect, each one of the elastically deformable plates 11a, 11b comprises an indentation region in the connection area 16. By way of example, the elastically deformable plate 11a has an indentation region 16a, and the elastically deformable plate 11b has an indentation region 16b. Illustratively, the indentation regions 16a, 16b join each other.

Preferably, the indentation regions 16a, 16b of the elastically deformable plates 11a, 11b are attached to each other, preferentially by means of suitable attachment means. By way of example, the indentation regions 16a, 16b are attached to each other via suitable connecting bolts 13d, 13e. A respectively required number of the connecting bolts 13d, 13e can be determined in an application-specific manner and vary from one application to another.

Figure 5:
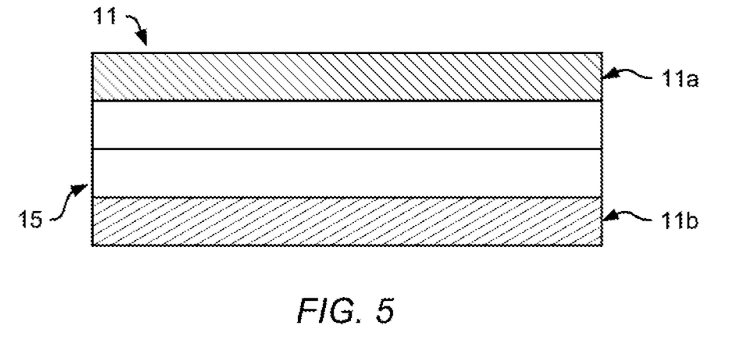
FIG. 5 shows a first sectional view of the elastic flapping hinge of FIG. 4, seen along a cut line V-V of FIG. 4.

FIG. 5 shows the elastic flapping hinge member arrangement 11 of FIG. 4 with the elastically deformable plates 11a, 11b in the elastic flapping hinge area 15. FIG. 5 further illustrates the spacing apart of the elastically deformable plates 11a, 11b in the elastic flapping hinge area 15 of FIG. 4, as well as an exemplary rectangular cross section of the elastically deformable plates 11a, 11b in the elastic flapping hinge area 15. However, other cross sections such as e. g. trapezoidal are likewise contemplated.

Figure 6:
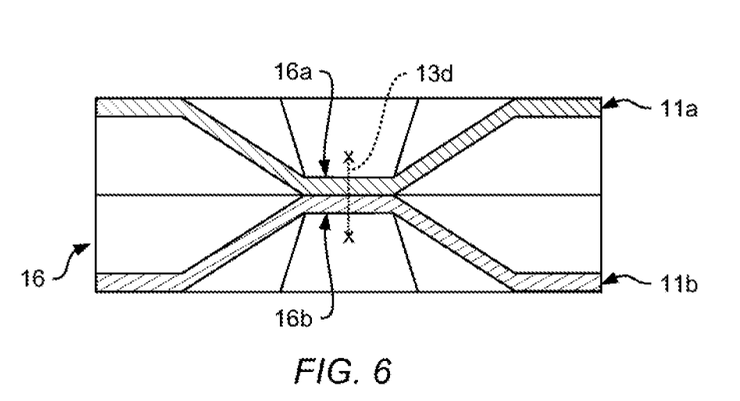
FIG. 6 shows a second sectional view of the elastic flapping hinge of FIG. 4, seen along a cut line VI-VI of FIG. 4.

FIG. 6 shows the elastic flapping hinge member arrangement 11 of FIG. 4 with the elastically deformable plates 11a, 11b in the connection area 16. The elastically deformable plates 11a, 11b are provided in the connection area 16 with the indentation regions 16a, 16b of FIG. 4, thus, exhibiting an exemplary flattened Ω-(Omega-)shaped cross section in the connection area 16. It should be noted that the flattened Ω-shaped cross section can easily be recognized with respect to the elastically deformable plate 11b, while the flattened Ω-shaped cross section of the elastically deformable plate 11a is illustratively shown upside down.

The indentation regions 16a, 16b are illustratively formed as grooves with bevelled side walls that are chamfered starting at the elastically deformable plates 11a, 11b, respectively. FIG. 6 further illustrates the attachment of the indentation regions 16a, 16b to each other in the connection area 16 via the suitable connecting bolts 13d of FIG. 4.

Figure 7:
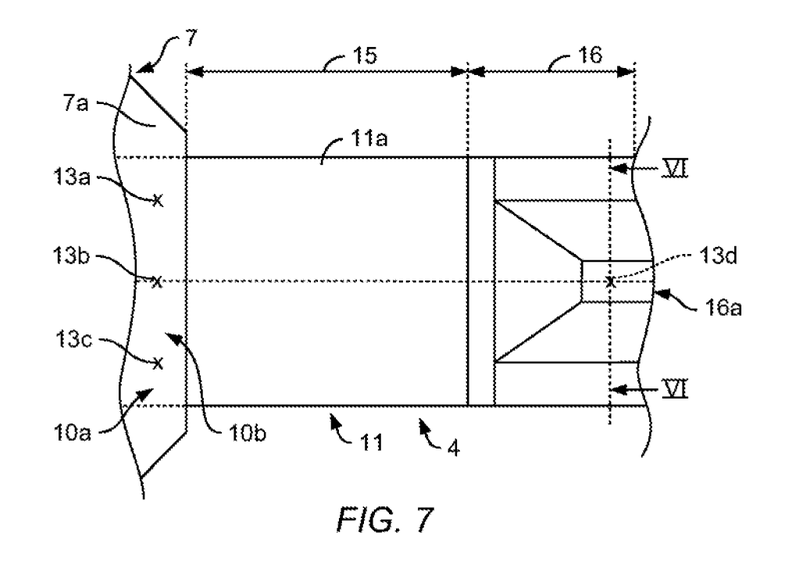
FIG. 7 shows a top view of the elastic flapping hinge of FIG. 4.

FIG. 7 shows the elastic flapping hinge 4 of FIG. 4 with the elastic flapping hinge member arrangement 11. The latter comprises the elastically deformable plates 11a, 11b that are mounted to the rotor hub 7 of FIG. 4.

More specifically, in the hub attachment area 10b of the elastic flapping hinge member arrangement 11, the elastically deformable plates 11a, 11b are attached to the rotor hub 7 of FIG. 4 at the hub connecting point 10a by means of the hub connecting bolts 13a. However, in contrast to FIG. 4, the elastically deformable plates 11a, 11b are now further attached to the rotor hub at the hub connecting point 10a by additional suitable hub connecting bolts 13b, 13c.

FIG. 7 also further illustrates the indentation region 16a of the elastically deformable plate 11a in the connection area 16. In particular, the bevelled side walls that are chamfered starting at the elastically deformable plate 11a for forming the indentation region 16a are illustrated in more detail.

Figure 8:
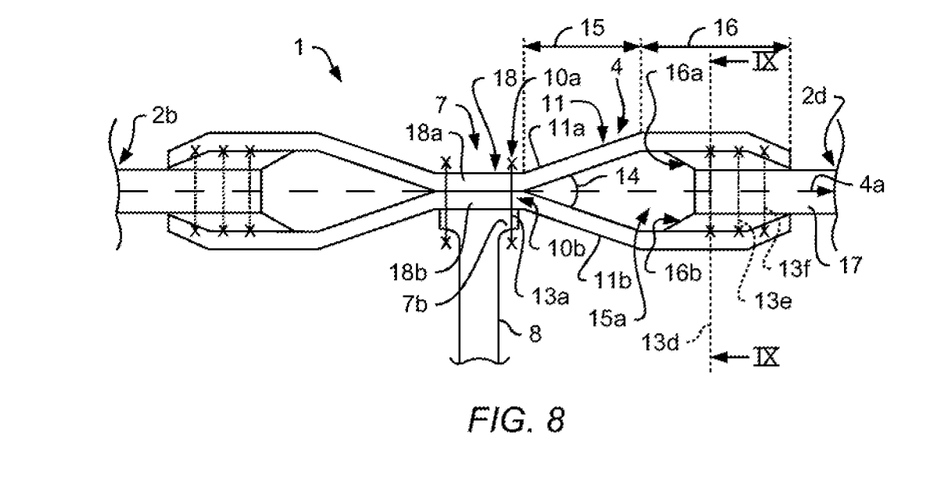
FIG. 8 shows a sectional view of the elastic flapping hinge of FIG. 1 according to still another aspect.

FIG. 8 shows the multi-blade rotor 1 of FIG. 1 with the elastic flapping hinge 4 of FIG. 4 that is connected to the rotor blade 2d of FIG. 1. The elastic flapping hinge 4 comprises the elastic flapping hinge member arrangement 11 with the elastically deformable plates 11a, 11b. The elastic flapping hinge member arrangement 11 includes the hub attachment area 10b, the elastic flapping hinge area 15 and the connection area 16. In the hub attachment area 10b of the elastic flapping hinge member arrangement 11, the elastically deformable plates 11a, 11b are attached to the rotor hub 7 of FIG. 4 by means of the hub connecting bolts 13a. In the elastic flapping hinge area 15, the elastically deformable plates 11a, 11b diverge from each other by the predetermined divergence angle 14 of FIG. 4.

However, in contrast to FIG. 4 the elastic flapping hinge 4 is now not only connected in the hub attachment area 10b to the rotor hub 7, but also further connected at the rotor hub 7 to another elastic flapping hinge that is preferably diametrically opposed to the elastic flapping hinge 4 with respect to the rotor hub 7. This other elastic flapping hinge is illustratively connected to the rotor blade 2b of FIG. 1 and preferably integrally formed, i. e. as one piece, with the elastic flapping hinge 4 by means of a prolongation of the elastically deformable plates 11a, 11b.

More specifically, the elastically deformable plates 11a, 11b preferably form suitable connection elements 18 between the elastic flapping hinge 4 and the other elastic flapping hinge in the region of the rotor hub 7. Illustratively, the elastically deformable plate 11a forms a connection element 18a and the elastically deformable plate 11b forms a connection element 18b.

According to one aspect, the other elastic flapping hinge is identical to the elastic flapping hinge 4, at least within predetermined manufacturing tolerances. Therefore, the other elastic flapping hinge is not described in greater detail, for brevity and conciseness. Furthermore, respective components of the other elastic flapping hinge are not labelled in FIG. 8, for simplicity and clarity of the drawings.

It should be noted that the configuration shown in FIG. 8 is particularly suitable if the multi-blade rotor 1 only comprises the two rotor blades 2b, 2d. In this case, the rotor hub 7 may also be simplified by providing only the lower hub plate 7b of FIG. 4 for attachment of the elastically deformable plates 11a, 11b, resp. of the connection elements 18a, 18b.

Furthermore, also in contrast to FIG. 4 the indentation regions 16a, 16b of the elastically deformable plates 11a, 11b of the elastic flapping hinge 4 are now spaced apart from each other, i. e. they are preferably not in direct contact to each other. Instead, according to one aspect at least one spacer 17 is now arranged between the elastically deformable plates 11a, 11b, preferably at least between the indentation regions 16a, 16b of the elastically deformable plates 11a, 11b. The spacer 17 is preferably suitable for being connected to the rotor blade 2d and may also be implemented as an integral part of the rotor blade 2d.

The elastically deformable plates 11a, 11b and, preferably, the indentation regions 16a, 16b are attached to each other and to the spacer 17 by means of the connecting bolts 13d, 13e of FIG. 4, as well as additional connecting bolts 13f. The spacer 17 is preferably embodied as a plate- or bar-resp. beam-shaped component.

Figure 9:
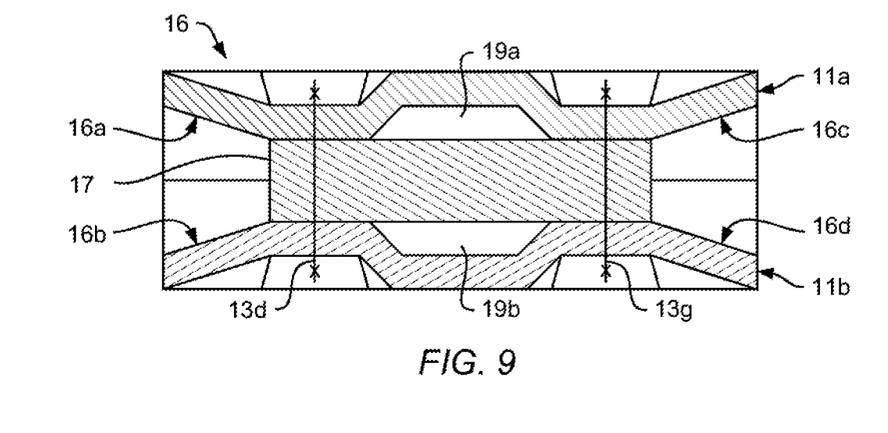
FIG. 9 shows a sectional view of the elastic flapping hinge of FIG. 8, seen along a cut line IX-IX of FIG. 8.

FIG. 9 shows the elastically deformable plates 11a, 11b of FIG. 8 in the connection area 16. The elastically deformable plates 11a, 11b are provided in the connection area 16 with the indentation regions 16a, 16b of FIG. 4.

However, in contrast to FIG. 4 and FIG. 6 the elastically deformable plate 11a now comprises in addition to the indentation region 16a an additional indentation region 16c in the connection area 16. Likewise, the elastically deformable plate 11b now comprises in addition to the indentation region 16b an additional indentation region 16d in the connection area 16. Thus, each one of the elastically deformable plates 11a, 11b exhibits at least approximately a W-shaped cross section.

Preferably, the indentation regions 16c, 16d are at least similar to the indentation regions 16a, 16b, at least within predetermined manufacturing tolerances. Therefore, a more detailed description of the indentation regions 16c, 16d can be omitted for brevity and conciseness. However, it should be noted that the indentation regions 16a, 16b and, thus, also the indentation regions 16c, 16d are preferentially not as deep as illustrated in FIG. 6.

More specifically, according to one aspect the indentation regions 16a, 16b, 16c, 16d are formed and preferably spaced apart from each other such that the spacer 17 of FIG. 8 can be arranged between the elastically deformable plates 11a, 11b, and, preferentially, at least between the indentation regions 16a, 16c of the elastically deformable plate 11a and the indentation regions 16b, 16d of the elastically deformable plate 11b. Thus, a gap 19a is provided between the spacer 17 and the elastically deformable plate 11a and a similar gap 19b is provided between the spacer 17 and the elastically deformable plate 11b. The gaps 19a, 19b are preferably provided for reinforcing and stiffening a corresponding support of the elastically deformable plates 11a, 11b.

According to one aspect, the indentation regions 16a, 16c of the elastically deformable plate 11a are attached to the indentation regions 16b, 16d of the elastically deformable plate 11b, and to the spacer 17, respectively. The attachment of the indentation region 16a to the spacer 17 and the indentation region 16b is illustratively performed by means of the connecting bolt 13d of FIG. 8, and the attachment of the indentation region 16c to the spacer 17 and the indentation region 16b is illustratively performed by means of a connecting bolt 13g.

It should be noted that the indentation regions 16a, 16b, 16c, 16d are only implemented by way of example as illustrated in FIG. 9 such that the spacer 17 can be arranged between these indentation regions 16a, 16b, 16c, 16d. However, in analogy to FIG. 6 the indentation regions 16a, 16b, 16c, 16d may alternatively also be implemented such that they directly contact each other. Similarly, more than two indentation regions per elastically deformable plate can be provided. Moreover, the respective indentation regions of a given elastically deformable plate may be provided with different depths.

Figure 10:
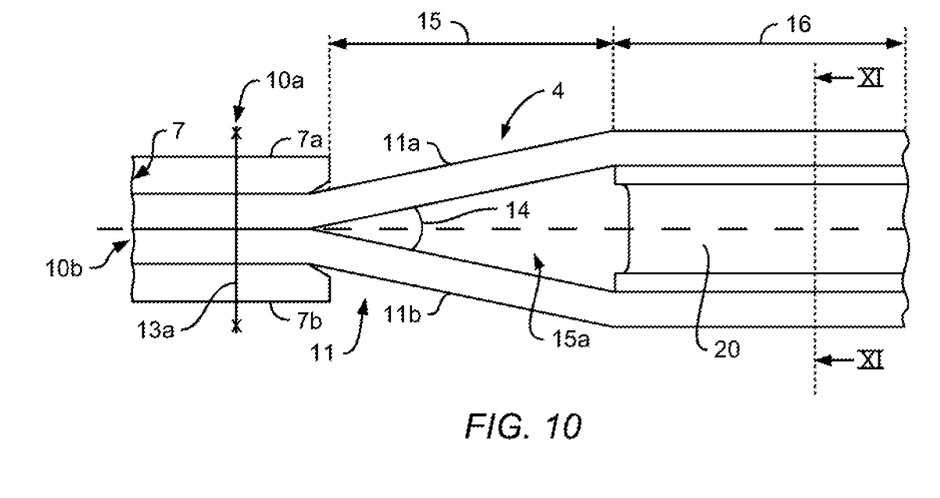
FIG. 10 shows a sectional view of the elastic flapping hinge of FIG. 1 according to still another aspect.

FIG. 10 shows the elastic flapping hinge 4 of FIG. 4 that comprises the elastic flapping hinge member arrangement 11 with the elastically deformable plates 11a, 11b. The elastic flapping hinge member arrangement 11 includes the hub attachment area 10b, the elastic flapping hinge area 15 and the connection area 16. In the hub attachment area 10b of the elastic flapping hinge member arrangement 11, the elastically deformable plates 11a, 11b are attached to the rotor hub 7 of FIG. 4 by means of the hub connecting bolts 13a. In the elastic flapping hinge area 15, the elastically deformable plates 11a, 11b diverge from each other by the predetermined divergence angle 14 of FIG. 4.

However, in contrast to FIG. 4 the indentation regions 16a, 16b of the elastically deformable plates 11a, 11b are now omitted in the connection area 16. Instead, the elastically deformable plates 11a, 11b are now preferably also plate-shaped in the connection area 16 and at least one web 20 is arranged in the connection area 16 between the elastically deformable plates 11a, 11b.

Preferably, the at least one web 20 spaces the elastically deformable plates 11a, 11b in the connection area 16 from each other. According to one aspect, the at least one web 20 is at least adapted to transfer shear forces between the elastically deformable plates 11a, 11b.

Figure 11:
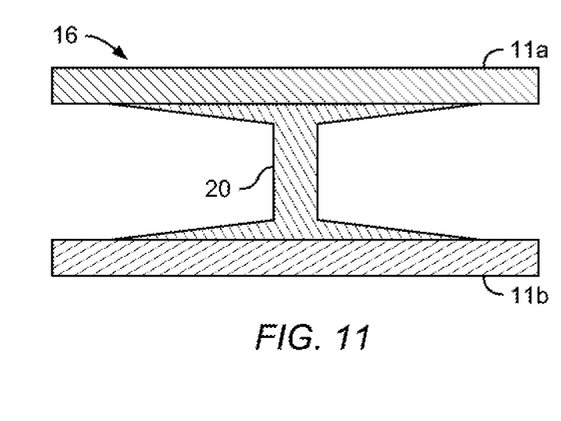
FIG. 11 shows a sectional view of the elastic flapping hinge of FIG. 10, seen along a cut line XI-XI of FIG. 10.

FIG. 11 shows the elastically deformable plates 11a, 11b of FIG. 10 in the connection area 16. The elastically deformable plates 11a, 11b are spaced apart in the connection area 16 by means of the at least one web 20 of FIG. 10.

According to one aspect, the at least one web 20 is embodied as a beam. Preferably, the at least one web 20 is embodied as an I-beam.

Figure 12:
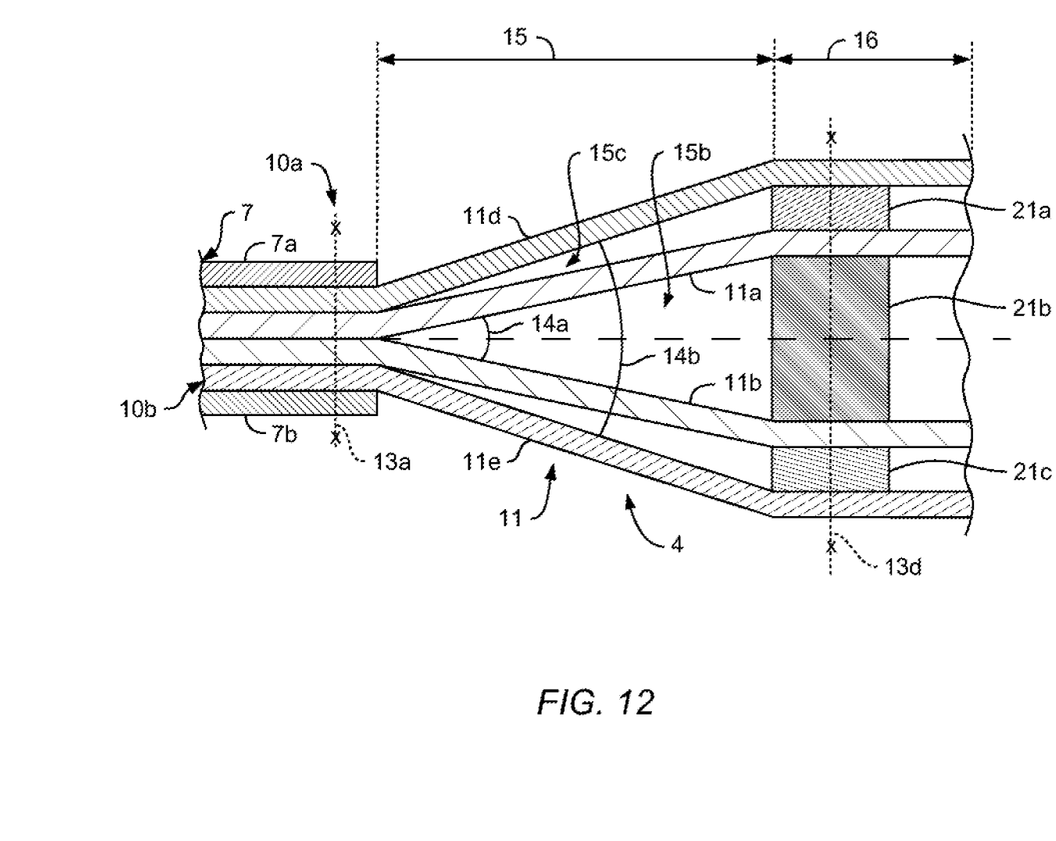
FIG. 12 shows a sectional view of the elastic flapping hinge of FIG. 1 according to still another aspect.

FIG. 12 shows the elastic flapping hinge 4 of FIG. 4 that comprises the elastic flapping hinge member arrangement 11 with the elastically deformable plates 11a, 11b. The elastic flapping hinge member arrangement 11 includes the hub attachment area 10b, the elastic flapping hinge area 15 and the connection area 16.

However, in contrast to FIG. 4, the elastically deformable plates 11a, 11b now diverge from each other in the elastic flapping hinge area 15 by a predetermined divergence angle 14a such that now an at least approximately V-shaped gap 15b is formed in the elastic flapping hinge area 15 between the two elastic flapping hinge members 11a, 11b. The predetermined divergence angle 14a is preferably smaller than the predetermined divergence angle 14 of FIG. 4. Furthermore, also in contrast to FIG. 4, now two additional elastic flapping hinge members 11d, 11e are provided, which are preferably also implemented as elastically deformable plates.

According to one aspect, the additional elastically deformable plates 11d, 11e diverge from each other in the elastic flapping hinge area 15 by a predetermined divergence angle 14b such that an at least approximately V-shaped gap 15c is formed in the elastic flapping hinge area 15 between the two elastic flapping hinge members 11d, 11e. The predetermined divergence angle 14b is preferably greater than the predetermined divergence angle 14a. Preferentially, the predetermined divergence angle 14b corresponds to the predetermined divergence angle 14 of FIG. 4.

By way of example, the elastically deformable plates 11d, 11e encompass the elastically deformable plates 11a, 11b. Illustratively, the elastically deformable plate 11d is arranged over the elastically deformable plate 11a and the elastically deformable plate 11e is arranged below the elastically deformable plate 11b.

Furthermore, in contrast to FIG. 4 the indentation regions 16a, 16b of the elastically deformable plates 11a, 11b are now omitted in the connection area 16. Instead, the elastically deformable plates 11a, 11b are now preferably also plate-shaped in the connection area 16. Similarly, also the elastically deformable plates 11d, 11e are preferably plate-shaped in the connection area 16.

According to one aspect, the elastically deformable plate 11d is spaced apart from the elastically deformable plate 11a by an associated spacer 21a, the elastically deformable plate 11a is spaced apart from the elastically deformable plate 11b by an associated spacer 21b, and the elastically deformable plate 11b is spaced apart from the elastically deformable plate 11e by an associated spacer 21c. The spacers 21a, 21b, 21c are preferably embodied as spacer blocks.

It should be noted that in FIG. 12 four elastically deformable plates 11a, 11b, 11d, 11e and three spacer blocks 21a, 21b, 21c are shown. However, more than the four elastically deformable plates 11a, 11b, 11d, 11e and also more than the three spacer blocks 21a, 21b, 21c may likewise be provided.

Figure 13:
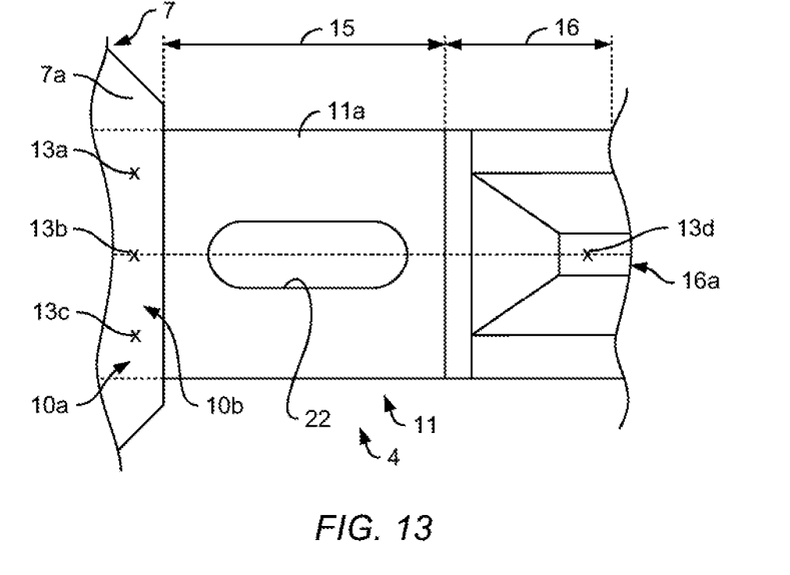
FIG. 13 shows a sectional view of the elastic flapping hinge of FIG. 1 according to still another aspect.

FIG. 13 shows the elastic flapping hinge 4 of FIG. 4 with the elastic flapping hinge member arrangement 11 that includes the hub attachment area 10b, the elastic flapping hinge area 15 and the connection area 16. The elastic flapping hinge member arrangement 11 comprises the elastically deformable plates 11a, 1ib. However, in FIG. 13 only the elastically deformable plate 11a is visible.

According to one aspect and in contrast to FIG. 4, at least one of the elastically deformable plates 11a, 11b comprises at least one cut-out. Illustratively, the elastically deformable plate 11a is provided with a single cut-out 22. However, the elastically deformable plate 11b preferably also comprises such a cut-out.

Figure 14:
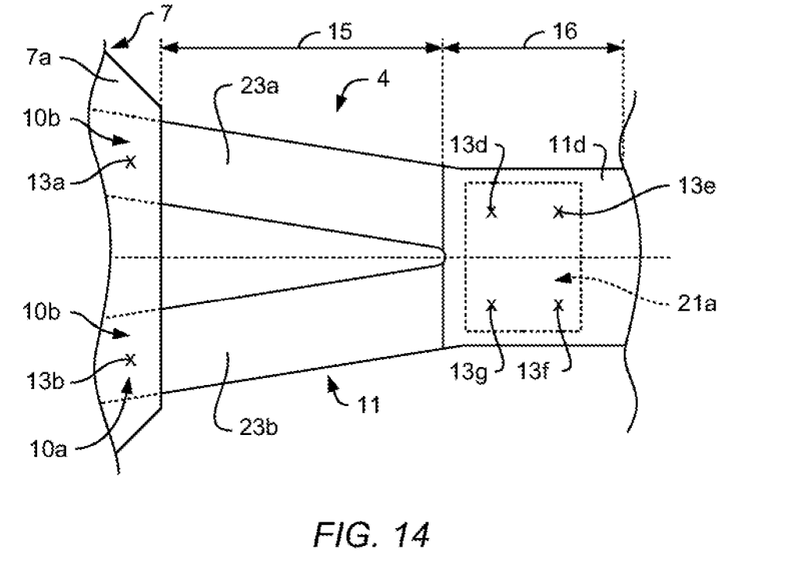
FIG. 14 shows a sectional view of the elastic flapping hinge of FIG. 12 according to another aspect.

FIG. 14 shows the elastic flapping hinge 4 of FIG. 12 with the elastic flapping hinge member arrangement 11 that includes the hub attachment area 10b, the elastic flapping hinge area 15 and the connection area 16. The elastic flapping hinge member arrangement 11 comprises the elastically deformable plates 11a, 11b, 11d, 11e. However, in FIG. 13 only the elastically deformable plate 11d is visible.

According to one aspect and in contrast to FIG. 12, at least one of the elastically deformable plates 11a, 11b, 11d, 11e is provided in the hub attachment area 10b with at least two separate arms. Illustratively, the elastically deformable plate 11d is provided with two separate arms 23a, 23b. However, preferably each one of the other elastically deformable plates 11a, 11b, 11e is likewise provided with such arms.

FIG. 14 further illustrates attachment of the spacer block 21a, and likewise of the spacer blocks 21b, 21c of FIG. 12, to the elastically deformable plates 11a, 11b, 11d, 11e by means of the connecting bolts 13d, 13e, 13f, 13g.

It should be noted that the above described embodiments are merely described to illustrate possible variants of the present invention, but not in order to restrict the present invention thereto. Instead, multiple modifications and variations of the invention are possible and should, therefore, also be considered as being part of the invention. In particular, it should be noted that the elastically deformable plates are generally shown and described as being parallel in the connection area. However, they do not necessarily need to be parallel in the connection area and may instead diverge or converge in the connection area. Furthermore, the elastically deformable plates may generally at least partly be integrated into at least one of respective hub plates of the rotor hub, an associated elastic lead-lag hinge and/or torsion area that may define the connection area, and an associated rotor blade. Moreover, the elastically deformable plates can generally be made of any suitable material, but are preferably made of fiber composite materials, preferentially fiber reinforced polymers such as carbon fiber reinforced polymers, glass fiber reinforced polymers or Aramid fiber reinforced polymers. However, other materials and combinations of materials such as composite materials with organic matrix with glass, carbon, aramid, basalt, or metal fibers, and/or composite materials with non-organic matrix with glass, carbon, aramid, basalt, or metal fibers, and/or metal, such as steel and/or titanium, may likewise be used. Furthermore, the webs and spacers may be integral parts of the elastically deformable plates or being glued thereto by means of a suitable adhesive or even bolts or rivets.

REFERENCE LIST 1 multi-blade rotor
2a, 2b, 2c, 2d, 2e rotor blades
3 elastic hinge unit
3a, 3b, 3c, 3d, 3e blade connecting points
4 elastic flapping hinge
4a elastic flapping hinge longitudinal direction
5 multiplicity of torsion elements
5a, 5b, 5c, 5d, 5e torsion elements
6 multiplicity of control cuffs
6a, 6b, 6c, 6d, 6e control cuffs
7 rotor hub
7a upper hub plate
7b lower hub plate
8 rotor shaft 9 rotor head covering cap
9a rotor head covering cap cut-out
10 plurality of hub connecting points
10a hub connecting point
10b hub attachment area
11 elastic flapping hinge member arrangement
11a, 11b, 11c, 11d, 11e elastic flapping hinge members
12 bending force direction
13a, 13b, 13c hub connecting bolts
13d, 13e, 13f, 13g elastic flapping hinge member connecting bolts
14, 14a, 14b divergence angles
15 elastic flapping hinge area
15a, 15b, 15c V-shaped gaps
16 connection area
16a, 16b, 16c, 16d connection indentation regions
17 spacer plate
18 elastic flapping hinge member connection elements
18a, 18b elastic flapping hinge member connection element
19a, 19b gaps
20 connecting web
21a, 21b, 21c spacer blocks
22 elastic flapping hinge member cut-out
23a, 23b elastic flapping hinge member arms
24 elastic lead-lag hinge and/or torsion area

What is claimed is:

1. An elastic flapping hinge for connecting a rotor blade to a rotor hub of a rotary wing aircraft, comprising an elastic flapping hinge member arrangement that includes a hub attachment area for attachment to the rotor hub, a connection area for attachment to the rotor blade, and an elastic flapping hinge area that is arranged between the hub attachment area and the connection area and adapted to allow flapping movements, the elastic flapping hinge member arrangement comprising at least two elastic flapping hinge members having a first bending stiffness for flapping movements and a second bending stiffness for lead-lag movements, the first bending stiffness being smaller than the second bending stiffness, wherein the at least two elastic flapping hinge members are stacked on top of each other at the rotor hub, and the at least two elastic flapping hinge members diverge from each other in the elastic flapping hinge area by a predetermined divergence angle;
wherein the at least two elastic flapping hinge members diverge from each other in the elastic flapping hinge area by the predetermined divergence angle such that a V-shaped gap is formed in the elastic flapping hinge area between the at least two elastic flapping hinge members;
wherein the at least two flapping hinge members comprise a first elastically deformable plate having first and second indentation regions in the connection area and a second elastically deformable plate having first and second indentation regions in the connection area.

2. The elastic flapping hinge of claim 1,
wherein the predetermined divergence angle is from 3° to 40°.

3. The elastic flapping hinge of claim 2,
wherein the elastically deformable plates are directly joined to each other in the hub attachment area, and wherein the elastically deformable plates are directly or indirectly joined to each other in the connection area.

4. The elastic flapping hinge of claim 3,
wherein at least one web is arranged in the connection area between the elastically deformable plates, wherein the at least one web spaces the elastically deformable plates from each other, and wherein the at least one web is adapted to transfer shear forces between the elastically deformable plates.

5. The elastic flapping hinge of claim 4,
wherein the at least one web is embodied as an I-beam.

6. The elastic flapping hinge of claim 3,
wherein at least one of the elastically deformable plates comprises at least one cut-out.

7. The elastic flapping hinge of claim 3,
wherein at least one of the elastically deformable plates is provided in the hub attachment area with at least two separate arms for attachment to the rotor hub.

8. The elastic flapping hinge of claim 3,
wherein the elastically deformable plates are at least partly integrated into at least one of:
associated rotor hub plates,
an associated elastic lead-lag hinge and/or torsion area that defines the connection area, and
the rotor blade.

9. The elastic flapping hinge of claim 1,
wherein the elastically deformable plates are attached to each other.

10. The elastic flapping hinge of claim 1, wherein the elastically deformable plates exhibit a W-shaped cross section.

11. The elastic flapping hinge of claim 10,
wherein the first and second indentation regions of the first elastically deformable plate are attached to the first and second indentation regions of the second elastically deformable plate.

12. The elastic flapping hinge of claim 11,
wherein a spacer is arranged between the first elastically deformable plate and the second elastically deformable plate, at least between the first and second indentation regions of the first elastically deformable plate and the first and second indentation regions of the second elastically deformable plate.

13. A rotary wing aircraft with at least one rotor that comprises at least two rotor blades, and with a rotor hub, each one of the at least two rotor blades being connected to the rotor hub via an associated elastic hinge unit that comprises at least an elastic flapping hinge that is embodied according to claim 1.

14. An elastic flapping hinge for connecting a rotor blade to a rotor hub of a rotary wing aircraft, the elastic flapping hinge comprising an elastic flapping hinge member arrangement that includes a hub attachment area for attachment to the rotor hub, a connection area for attachment to the rotor blade, and an elastic flapping hinge area arranged between the hub attachment area and the connection area and adapted to allow flapping movements, the elastic flapping hinge member arrangement comprising at least two elastic flapping hinge members having a first bending stiffness for flapping movements and a second bending stiffness for lead-lag movements, the first bending stiffness being smaller than the second bending stiffness, wherein the at least two elastic flapping hinge members are stacked on top of each other at the rotor hub, and the at least two elastic flapping hinge members diverge from each other in the elastic flapping hinge area by a predetermined divergence angle;
wherein the at least two flapping hinge members comprise a first elastically deformable plate having first and second indentation regions in the connection area and a second elastically deformable plate having first and second indentation regions in the connection area, the first and second indentation regions of the first elastically deformable plate are attached to the first and second indentation regions of the second elastically deformable plate.

15. The elastic flapping hinge of claim 14, wherein the first and second elastically deformable plates diverge from each other in the elastic flapping hinge area by the predetermined divergence angle such that a V-shaped gap is formed in the elastic flapping hinge area between the first and second elastically deformable plates.

16. The elastic flapping hinge of claim 14, wherein a spacer is arranged between the first and second elastically deformable plates between the first and second indentation regions of the first elastically deformable plate and the first and second indentation regions of the second elastically deformable plate.

17. The elastic flapping hinge of claim 14, wherein at least one beam is arranged in the connection area between the elastically deformable plates, wherein the at least one beam spaces the elastically deformable plates from each other, and wherein the at least one beam is adapted to transfer shear forces between the elastically deformable plates.

18. The elastic flapping hinge of claim 17, wherein the first and second elastically deformable plates exhibit a W-shaped cross section.

19. An elastic flapping hinge for connecting a rotor blade to a rotor hub of a rotary wing aircraft, comprising an elastic flapping hinge member arrangement that includes a hub attachment area for attachment to the rotor hub, a connection area for attachment to the rotor blade, and an elastic flapping hinge area that is arranged between the hub attachment area and the connection area and adapted to allow flapping movements, the elastic flapping hinge member arrangement comprising at least two elastic flapping hinge members having a first bending stiffness for flapping movements and a second bending stiffness for lead-lag movements, the first bending stiffness being smaller than the second bending stiffness, wherein the at least two elastic flapping hinge members are stacked on top of each other at the rotor hub, and the at least two elastic flapping hinge members diverge from each other in the elastic flapping hinge area by a predetermined divergence angle; wherein the at least two elastic flapping hinge members diverge from each other in the elastic flapping hinge area by the predetermined divergence angle such that a V-shaped gap is formed in the elastic flapping hinge area between the at least two elastic flapping hinge members;

wherein the at least two elastic flapping hinge members are elastically deformable plates directly joined to each other in the hub attachment area, and wherein the elastically deformable plates are directly or indirectly joined to each other in the connection area; and wherein a first one of the elastically deformable plates comprises first and second indentation regions in the connection area, and wherein a second one of the elastically deformable plates comprises first and second indentation regions in the connection area, the first one and the second one of the elastically deformable plates exhibiting a W-shaped cross section.

20. The elastic flapping hinge of claim 19, wherein the predetermined divergence angle is from 3° to 40°.

* * * * *